United States Patent [19]

Yokoyama

[11] Patent Number: 4,729,704

[45] Date of Patent: Mar. 8, 1988

[54] SCREW GROMMET

[75] Inventor: Naoshi Yokoyama, Nagoya, Japan

[73] Assignee: Nifco Inc., Yokohama, Japan

[21] Appl. No.: 772,369

[22] Filed: Sep. 4, 1985

[30] Foreign Application Priority Data

Sep. 7, 1984 [JP] Japan .................. 59-136058[U]

[51] Int. Cl.⁴ ............................................. F16B 13/06
[52] U.S. Cl. .................................. 411/61; 411/182; 411/913
[58] Field of Search ............... 411/15, 57, 60, 61, 411/63, 64, 182, 913, 44, 45, 47, 508–510

[56] References Cited

U.S. PATENT DOCUMENTS

| | | | |
|---|---|---|---|
| 2,836,214 | 5/1958 | Rapata | 411/182 |
| 2,975,814 | 3/1961 | Tinnerman | 411/182 |
| 4,203,193 | 5/1980 | Arthur | 411/61 |
| 4,311,421 | 1/1982 | Okada et al. | 411/60 |

FOREIGN PATENT DOCUMENTS

| | | | |
|---|---|---|---|
| 948975 | 6/1974 | Canada | 411/61 |
| 970263 | 7/1975 | Canada | 411/61 |
| 2161175 | 7/1973 | France | 411/61 |
| 707819 | 4/1954 | United Kingdom | 411/182 |

*Primary Examiner*—Neill Wilson
*Attorney, Agent, or Firm*—Trexler, Bushnell, Giangiorgi & Blackstone, Ltd.

[57] ABSTRACT

A screw grommet comprises a pair of flange halves, a pair of leg halves depending from the respective flange halves and a small thickness portion connecting the lower ends of the leg halves. When fitting the screw grommet, the leg halves are thrust into a panel opening and then a tapping screw is screwed into the threaded grooves to separate the leg halves from each other while their opposed surfaces remain parallel so that the screw grommet is reliably secured to the panel. Thus, the screw grommet is adaptable to tapping screws having different diameters and also to panels having different thicknesses or openings of different diameters.

4 Claims, 12 Drawing Figures

FIG. 1 (A) (PRIOR ART)
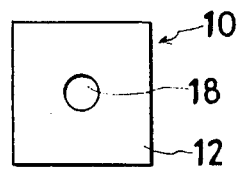
FIG. 1 (B) (PRIOR ART)
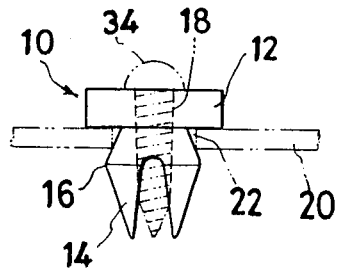
FIG. 2 (A) (PRIOR ART)
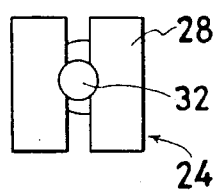
FIG. 2 (B) (PRIOR ART)
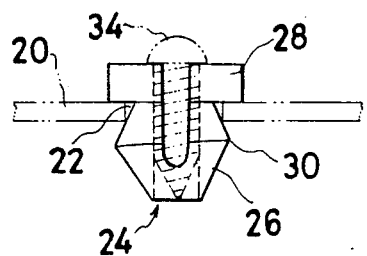
FIG. 2 (C) (PRIOR ART)
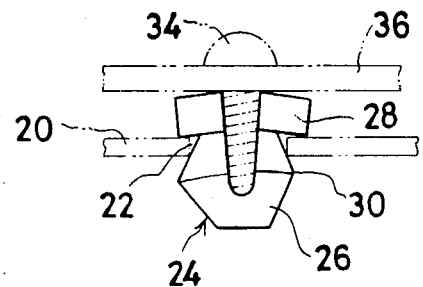

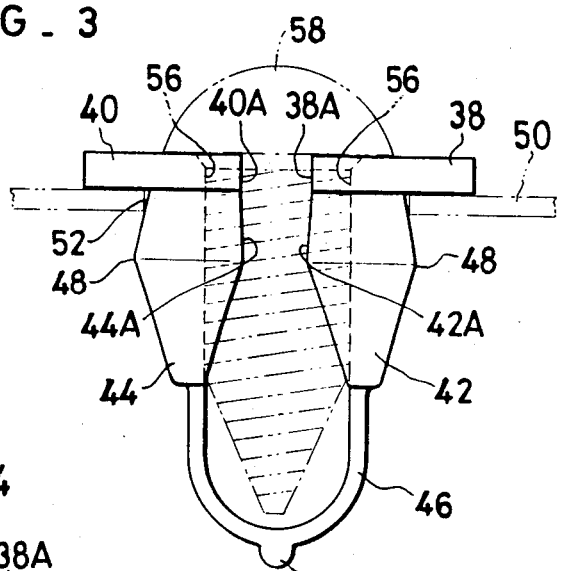
FIG_3
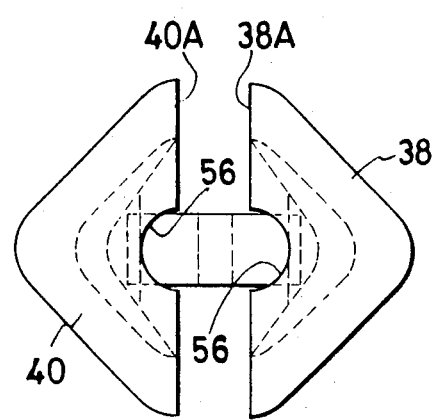
FIG_4
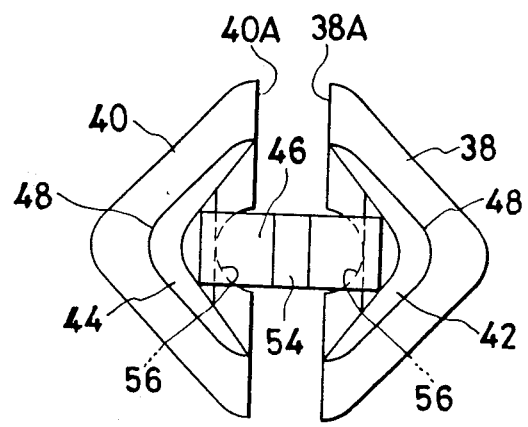
FIG_5

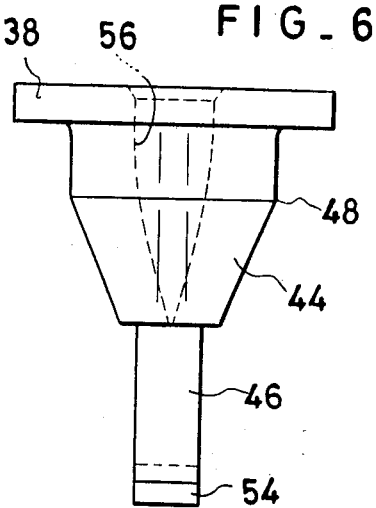
FIG_6
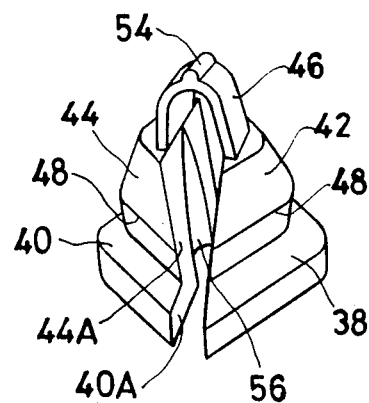
FIG_7
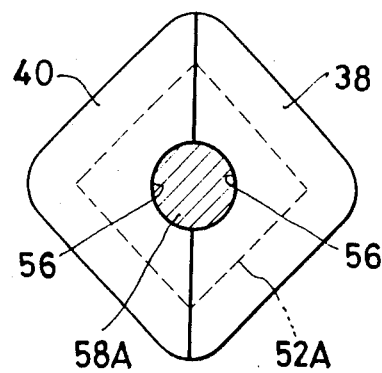
FIG_8
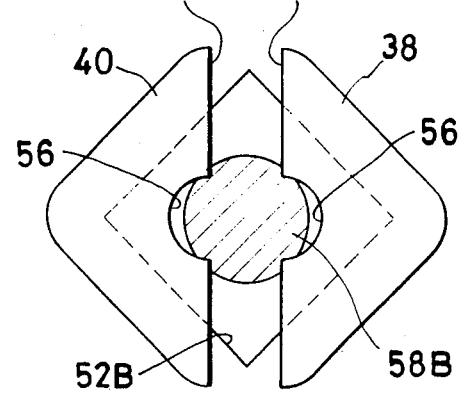
FIG_9

SCREW GROMMET

FIELD OF THE INVENTION AND RELATED ART STATEMENT

This invention relates to a screw grommet for securing together two panels in contact with each other or at a fixed distance from each other.

A prior art screw grommet of this type comprises a flange, and a bifurcated leg depending from the flange, with a threaded bore formed in the flange and leg, as disclosed in U.S. Pat. No. 3,869,958 and Japanese Utility Model Application Public Disclosure SHO No. 57 (1982)-200716. In use, the leg of the screw grommet is thrust into a panel opening and then a tapping screw is screwed in the threaded bore to expand the leg. As a result, an outer projection formed on the leg is brought into contact with the edge of the panel opening to thereby clamp the panel with the flange.

With the screw grommet of the above structure, where the panel is clamped between the flange and the outer projection of the leg, the panel can be effectively secured only when the extent of the expansion of the leg caused by the intrusion of the tapping screw is suited to the thickness of the panel and the diameter of the panel opening. With the prior art screw grommet structure which comprises the flange and bifurcated leg, the rigidity is high so that only a screw having a particular diameter can be used. Hence, the extent to which the leg expands is substantially fixed, so that the screw grommet is not adaptable for use with various panel thicknesses and panel opening diameters.

SUMMARY OF THE INVENTION

An object of the invention is to provide a screw grommet to which tapping screws having different diameters can be applied depending on the thickness of the panel and the diameter of panel opening and which can effectively secure panels having various thicknesses and openings of various diameters.

To attain the above object of the invention, there is provided a screw grommet which comprises a pair of flange halves, a pair of leg halves depending from the respective flange halves, a small thickness portion connecting the lower ends of the leg halves, and threaded grooves formed in opposed surfaces of the flange halves and leg halves, a tapping screw being screwed in the threaded grooves.

Since the flange halves and leg halves are coupled together by the small thickness portion, the paired leg halves inserted in the panel opening can be separated from each other with their opposed surfaces held parallel by the tapping screw screwed into the threaded grooves. Thus, the screw grommet can be used for panels having openings of various diameters with tapping screws having various diameters.

The above and other objects and features of the invention will become more apparent from the following description made with reference to the accompanying drawings.

BRIEF DESCRIPTION OF THE DRAWINGS

FIGS. 1A and 1B are respectively a plan view and a front view showing a prior art screw grommet;

FIGS. 2A, 2B and 2C are respectively a plan view and a front view showing another prior art grommet, and an explanatory diagram of the same in the state of being used.

FIG. 3 is a front view showing an embodiment of the screw grommet according to the invention;

FIG. 4 is a plan view showing the same embodiment;

FIG. 5 is a bottom view showing the same embodiment;

FIG. 6 is a right side view showing the same embodiment;

FIG. 7 is a perspective view showing the same embodiment;

FIG. 8 is a plan view showing the same embodiment in the state of being inserted in a small panel opening; and FIG. 9 is a plan view showing the same embodiment in the state of being inserted in a large panel opening.

DESCRIPTION OF THE PREFERRED EMBODDIMENT

The present invention relates to a screw grommet adaptable for use with panels having various thicknesses or openings of various diameters. Before describing the screw grommet according to the invention, examples of prior art screw grommets will be described with reference to FIGS. 1A and 1B. The illustrated screw grommet 10 comprises a flange 12, a bifurcated leg 14 depending from the flange 10 and having two lower branch portions facing each other, and engaging protuberances 16 formed on the outer periphery of the leg 14. The screw grommet 10 has a threaded hole 18 penetrating the flange 12 and leg 14.

At the time of insertion of the leg 14 into a panel opening 22, without any screw inserted, the leg 14 can be readily thrust into the panel opening 22 by downwardly urging the top of the flange 12 of the screw grommet 10. As the screw grommet 10 is downwardly urged, the gap between the lower branch portions of the leg 14 is elastically reduced as the projection 16 advances in contact with the edge of the opening 22. With further insertion, the projection 16 eventually clears the opening 22 and engages the back side of the panel 20. Further, since the projection 16 is tapered, it engages the panel 20 at different positions when the thickness of the panel 20 is different.

FIGS. 2A and 2B show a different prior art screw grommet 10. This screw grommet 10 comprises a leg 26 having two upper branch portions facing each other and flanges 28 integral with the top of the two upper branch portions. The leg 26 has a radial projection 30. The screw grommet has a threaded bore 32 extending through the flanges 28 into the leg 26.

At the time of insertion of the leg 26 through a panel opening 22, the projection 30 of the screw grommet is forcibly thrust into the opening 22 while reducing the size of the threaded bore 32 in the side of the flanges 28. When the projection 30 clears the opening 22, it expands owing to its elasticity. When a tapping screw 34 is screwed into the threaded bore 32, the projection 30 is further expanded to be engaged with the back side of the panel 20.

With this screw grommet 24, the upper branch portions of the bifurcated leg 26 are expanded and contracted around a lower end portion connecting the upper end portions of the leg. Since each of the two branch portions has a large thickness, great expansion and contraction of this part of the leg are impossible. Further, if a tapping screw having a large diameter should be used or if the opening 20 has a small size, the flanges 28 are apt to tilt as shown in FIG. 2C, causing variation in mounting height between different mounting panels 36.

In view of the above considerations, and the object of the present invention is to provide a screw grommet adaptable for mounting panels having various thicknesses or openings various diameters.

FIGS. 3 to 9 illustrate an embodiment of the screw grommet according to the invention.

This screw grommet, as shown in FIGS. 3 to 7, comprises a pair of flange halves 38 and 40 and leg halves 42 and 44 depending from the underside of the flange halves 38 and 40. The free ends of the leg halves 42 and 44 are coupled together by a small thickness portion 46. The flange halves 38 and 40, leg halves 42 and 44 and small thickness portion 46 are formed as a one-piece molding of a synthetic resin.

The leg halves 42 and 44 depending from the flange halves 38 and 40 are provided with respective outer projections 48.

The flange halves 38 and 40 are symmetrical and each have a substantially triangular plan shape as shown in FIG. 4. Their side surfaces 38A and 40A face each other, and the two flange halves 38 and 40 together form a substantially square shape.

Each of the leg halves 42 and 44 has a form of a substantially triangular pyramid. The side surfaces 42A and 44A of the leg halves 42 and 44 lie in the same plane as the side surfaces 38A and 40A of the flange halves 38 and 40. The leg halves 42 and 44 project at right angles from the lower surface of the flange halves 38 and 40.

The projections 48 project from the legs 42 and 44 on the side thereof opposite the side surfaces 42A and 44A. The legs 42 and 44 taper progressively from the projections 48 toward the small thickness portion 46, so that they can be readily inserted into the opening 52 of the mounting panel 50.

The small thickness portion 46 is in the form of a U-shaped thin strip with a central outer semi-circular protuberance 54 as an increased thickness portion.

Threaded grooves 56 are formed in the side surfaces 38A and 40A of the flange halves 38 and 40 and the side surfaces 42A and 44A of the leg halves 42 and 44. These threaded grooves 56 have a semi-circular sectional profile.

The above embodiment of the screw grommet is used as follows.

The screw grommet can readily be inserted into the opening 52 bored in the mounting panel 50 by bringing closer the side surfaces 42A and 44A of the legs 42 and 44. The side surfaces 42A and 44a may be brought closer by bringing closer the flange halves 38 and 40, or otherwise, by pressing down on the top surfaces of the flange halves 40 and 38 thereby bringing the tapered portions of the legs 42 and 44 into engagement with the edge of the opening 52.

After insertion, the leg halves 42 and 44 are spread away from each other in the diagonal direction of the opening 52 owing to the elasticity of the small thickness portion 46, thereby permitting the tapping screw 58 to be screwed into the threaded grooves 56.

As the leg halves 42 and 44 are separated from each other and urged against the edge of the opening 52, the outer surfaces of the leg halves 42 and 44 are held in close contact with the edge of the opening 52, and thus the reaction force at the time of introducing the screw can be reliably received.

At the time of screwing in a tapping screw 58, the flange halves 38 and 40 and leg halves 42 and 44 are separated from each other substantially linearly according to the outer shape of the tapping screw 58, so that, differently from the prior art screw grommet as shown in FIG. 2C, the screw grommet will not be detached from the panel opening.

As shown in FIGS. 8 and 9, the screw grommet according to the invention can, by adjusting the distance between the leg halves 42 and 44, be readily adapted to openings 52A and 52B formed with different diameters for use of tapping screws 58A and 58B.

As has been described in the foregoing, the screw grommet according to the invention comprises a pair of flange halves, a pair of leg halves extending from the respective flange halves, a small thickness portion connecting the free ends of the leg halves and threaded grooves formed in opposed surfaces of the flange halves and leg halves for accommodating a tapping screw. Thus, when the leg halves are inserted into an opening in a mounting panel, the opposite flange halves and leg halves can be moved relative to each other in the panel opening, so that the screw grommet according to the invention can adopt itself for tapping screws and openings having various diameters.

What is claimed is:

1. A one-piece screw grommet made of synthetic resin for use in connection with associated panels of various thicknesses and having openings of various diameters and screws having various diameters; said screw grommet comprising a pair of separated unconnected flange halves, a pair of separated tapered rigid leg halves depending one from each of said flange halves at opposite sides of a longitudinal axis of said screw grommet and a substantially narrow thin flat flexible elastic U-shaped strip of generally uniform width connecting the lower ends of said tapered leg halves, said U-shaped strip providing the sole connection between said leg halves, said tapered leg halves having outer projections; said tapered leg halves projecting at substantially right angles from the lower surface of the flange halves forming a substantially triangular pyramid; said flange halves and tapered leg halves having opposed grooves along their respective inner surfaces for receiving a screw, said U-shaped strip having sufficient initial axial extent and flexibility for enabling said flange halves and tapered leg halves to be separated from each other substantially lenearly according to the outer shape of a screw upon flexing of said U-shaped strip during insertion of the screw.

2. The screw grommet of claim 1 wherein the tapered leg halves are tapered progressively from said projections toward the U-shaped strip.

3. The screw grommet of claim 1 wherein said U-shaped strip extends from terminal ends of said tapered leg halves and intersects the longitudinal axis of said screw grommet.

4. A one piece screw grommet of synthetic resin for use in connection with associated panels of various thicknesses and having openings of various diameters and screws having various diameters; said screw grommet comprising a pair of flange halves, a pair of tapered rigid leg halves depending one from each of said flange halves at opposite sides of a longitudinal axis of said screw grommet, and a substantially narrow flexible elastic U-shaped strip connecting the lower ends of said tapered leg halves, said tapered leg halves having outer projections, said tapered leg halves projecting at substantially right angles from the lower surface of the flange halves forming a substantially triangular pyramid; said flange halves and tapered leg halves having opposed grooves along their respective inner surfaces for receiving a screw, said flange halves and tapered leg halves being separable from each other substantially linearly according to the outer shape of a screw upon flexing of said U-shaped strip during insertion of the screw, said tapered leg halves being tapered progressively from said projections toward the U-shaped strip, and said U-shaped strip including a central outer semi-circular increase thickness portion.

* * * * *